(12) United States Patent
Giovinazzi

(10) Patent No.: US 6,318,550 B1
(45) Date of Patent: Nov. 20, 2001

(54) COMPACT DISC CONTAINER

(76) Inventor: Thomas Giovinazzi, 1131 Hancebridge Rd., Millville, NJ (US) 08332-1203

( * ) Notice: Subject to any disclaimer, the term of this patent is extended or adjusted under 35 U.S.C. 154(b) by 0 days.

(21) Appl. No.: 09/679,829

(22) Filed: Oct. 5, 2000

(51) Int. Cl.[7] .................................................. B65D 85/57
(52) U.S. Cl. ..................... 206/308.1; 206/310; 312/9.16; 312/9.47
(58) Field of Search ................................ 206/308.1, 309, 206/310–313, 493; 312/9.11, 9.16, 9.47, 9.58, 9.63

(56) References Cited

U.S. PATENT DOCUMENTS

| 4,770,474 |   | 9/1988  | Ackeret .       |         |
|-----------|---|---------|-----------------|---------|
| 4,875,743 | * | 10/1989 | Gelardi et al.  | 312/13  |
| 4,998,618 | * | 3/1991  | Borgions        | 206/307 |
| 5,099,995 | * | 3/1992  | Karakane et al. | 206/309 |
| 5,150,354 | * | 9/1992  | Iwata et al.    | 360/133 |
| 5,244,084 |   | 9/1993  | Chan .          |         |
| 5,690,221 |   | 11/1997 | Yeh .           |         |
| 5,713,464 | * | 2/1998  | Chang           | 206/308.1 |
| 5,715,939 | * | 2/1998  | Yun-Ming        | 206/308.3 |
| 5,720,386 | * | 2/1998  | Allsop et al.   | 206/308.1 |
| 5,779,037 | * | 7/1998  | D'Agaro et al.  | 206/308.1 |
| 5,857,566 | * | 1/1999  | Fu              | 206/307.1 |

* cited by examiner

Primary Examiner—Shian Luong
(74) Attorney, Agent, or Firm—Brady, O'Boyle & Gates

(57) ABSTRACT

A compact disc container having a compact disc carrier pivotally mounted within a housing. The carrier is spring biased outwardly from a side of the housing and is held in a closed, stored position within the housing by a finger activated latch. The container can be manipulated by one hand and the compact disc is fully exposed-when the carrier is pivoted to the open position. A title/cover page can be viewable from the top of the container, and a label can be viewable from a side of the container. The compact disc container is intended to replace the traditional compact disc case having the disc packaged therein when purchased at the store.

5 Claims, 4 Drawing Sheets

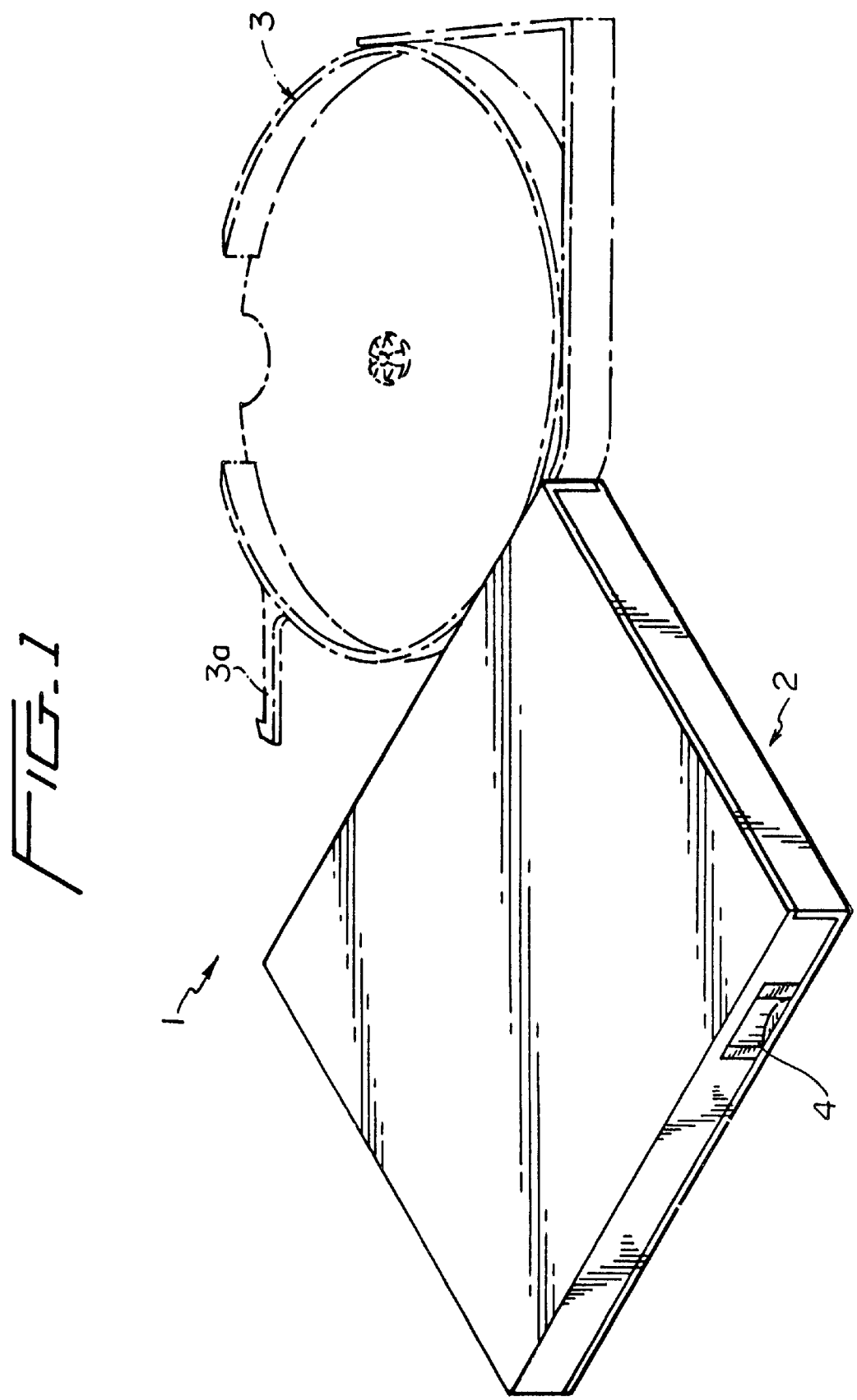

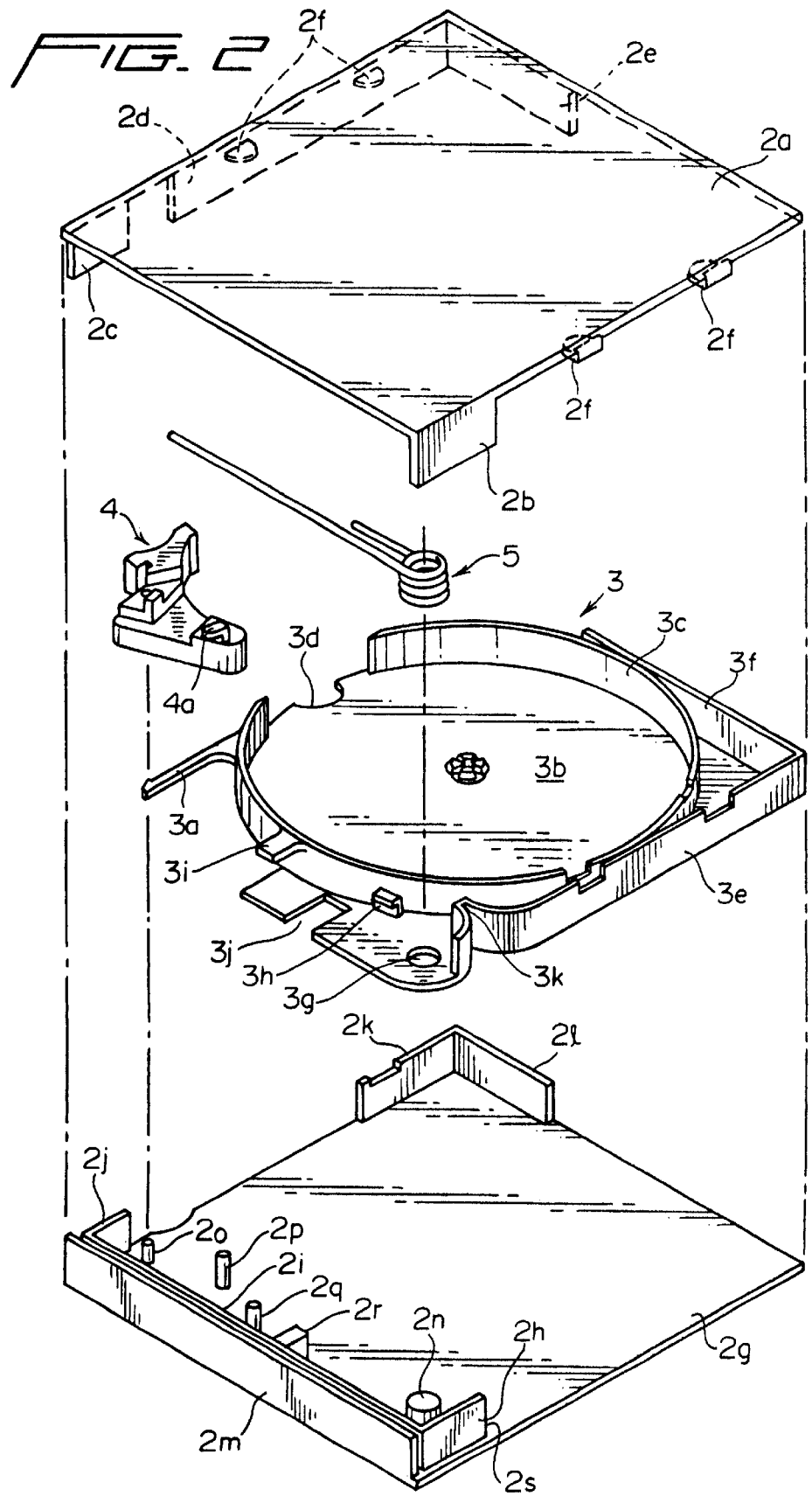

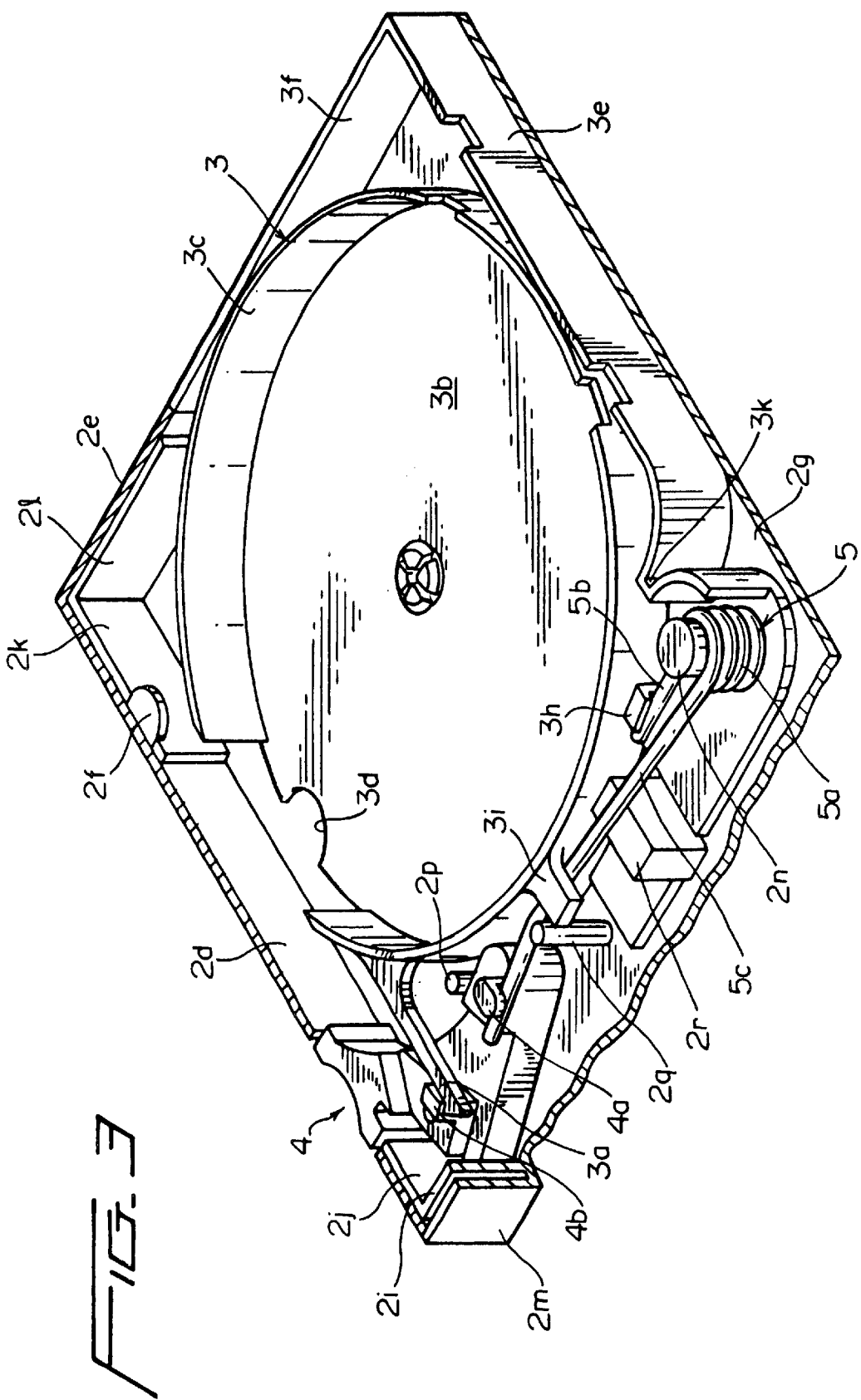

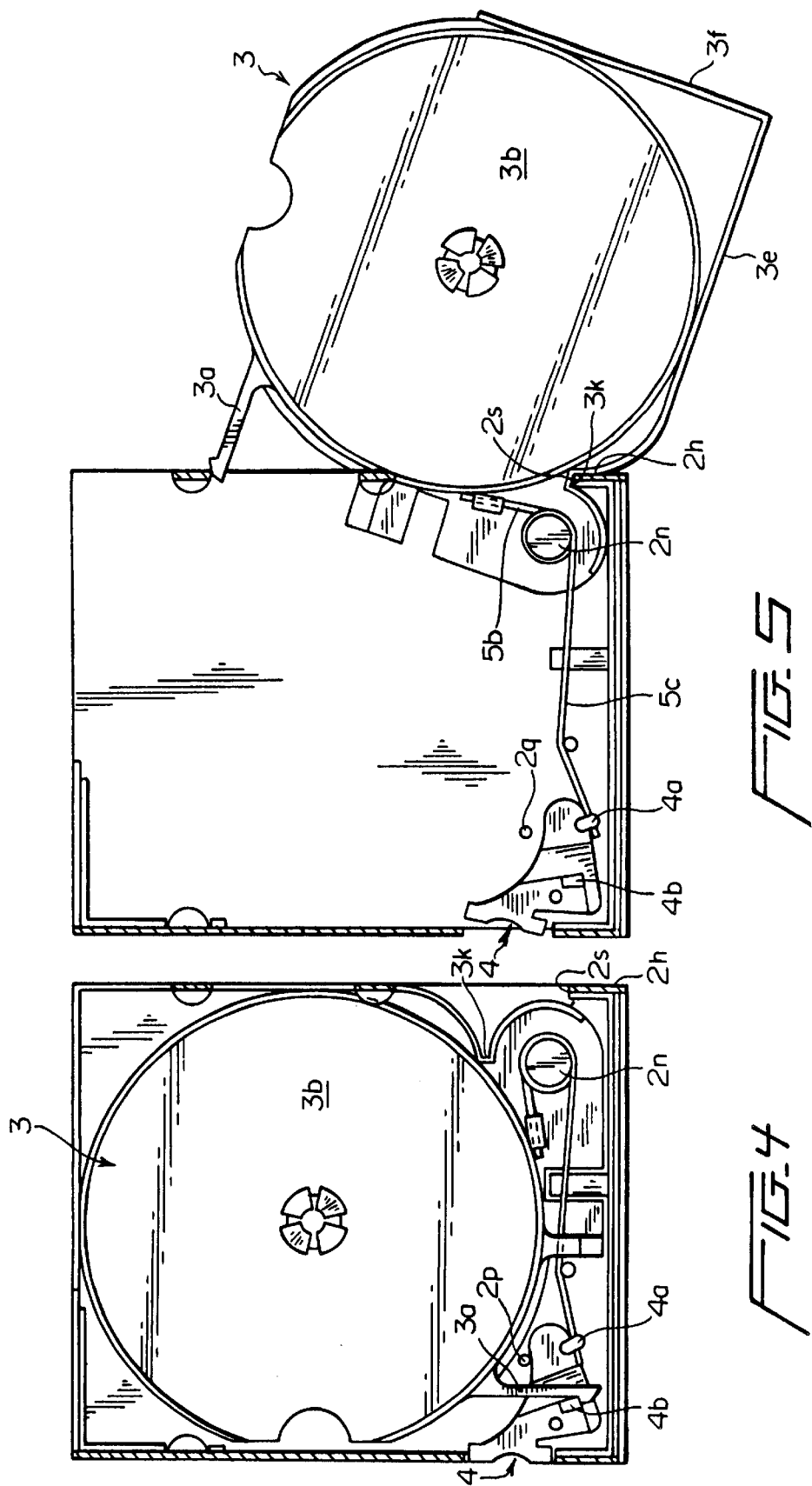

COMPACT DISC CONTAINER

BACKGROUND OF THE INVENTION

Prior art containers for compact discs have consisted of various types. The basic container consists essentially of a thin plastic base portion having a circular recess for receiving the disc, and an equally thin plastic cover or lid hingedly connected to the base portion along one edge thereof. While this container provided adequate storage for the compact disc, the opening of the lid to access the disc became difficult in some instances. It required a user's two hands to open the container, one to hold the base portion, and the other to open the lid; and, in view of the relative thinness of the container, the manipulation of the lid often times was difficult.

As an improvement on the above-noted compact disc container, U.S. Pat. Nos. 5,244,084 and 5,690,221 disclose containers wherein a housing is provided having a disc carrier pivotally mounted therein, whereby the carrier is manually pivoted out of the housing, to therby provide access to the disc on the carrier. Once again, this type of container required both hands of the user, one to hold the housing and the other to pull the disc carrier out of the housing.

In U.S. Pat. 4,770,474, it has been further suggested to spring bias the disc carrier outwardly of the housing and to hold the disc carrier in the stored position within the housing by means of a latch; however, the disadvantage of this type of container is characterized in that the full outward movement of the carrier is limited by stop members to thereby prevent full access to the disc.

SUMMARY OF THE INVENTION

After considerable research and experimentation, the compact disc container of the present invention has been devised to overcome the disadvantages experienced in the prior art compact disc containers, and comprises, essentially, a housing having a compact disc carrier or sled pivotal outwardly from a sidewall of the housing about a vertical axis. The carrier is spring biased outwardly from the side of the housing and held in a closed, stored position within the housing by a finger activated latch. The container can be manipulated by one hand and, by the construction and arrangement of the pivotal connection of the sled to the housing, the compact disc is fully exposed when the carrier is pivoted to the open position.

Since the compact disc container of the present invention is intended to replace the traditional compact disc case having the disc packaged therein when purchased at a store, the container is also constructed and arranged to hold a title/cover page viewable from the top of the container and a label viewable from a side of the container.

BRIEF DESCRIPTION OF THE DRAWINGS

FIG. 1 is a perspective view of the compact disc container of the present invention showing the disc carrier or sled in phantom in the open position;

FIG. 2 is an exploded view showing the components of the container;

FIG. 3 is a fragmentary perspective view of the assembled components of the bottom of the container and the sled;

FIG. 4 is a top plan view of the container with the top wall removed therefrom showing the sled in the closed, latched position within the container; and FIG. 5 is a top plan view of the container shown in FIG. 4, but showing the sled in the released position.

DESCRIPTION OF THE PREFERRED EMBODIMENT

Referring to the drawings and more particularly to FIG. 1, the compact disc container 1 of the present invention comprises a housing 2 and a disc carrier or sled 3 pivotal outwardly of the housing 2 and latched to a closed position by cooperating latch member 3a integral with the sled 3 and a release button 4 positioned in a sidewall of the housing.

The details of the components of the container are illustrated in FIG. 2 wherein it will be seen that the housing has a top wall 2a having depending sidewall portions 2b, 2c, 2d and 2e. Inwardly extending tabs 2f are provided on each side of the top wall 2a and spaced downwardly therefrom for supporting a title/cover page, not shown. The top wall 2a is transparent so that the page is viewable from the top of the container, The housing also has a bottom wall 2g having sidewall portions 2h, 2i, 2j, 2k and 2l. Another wall portion 2m is parallel to sidewall portion 2i and spaced outwardly therefrom for receiving a label, now shown, viewable from the side of the housing. An upwardly extending post 2n is integral with the bottom wall 2g as are pins 2o, 2p and 2q and block 2r. A marked up version is attached.

The disc carrier or sled 3 comprises a bottom wall 3b and an arcuate sidewall 3c forming a circular recess for a compact disc, not shown. A thumb notch 3d is provided in the peripheral edge of the circular recess to facilitate the removal of a disc therefrom. The bottom wall extends radially outwardly beyond the arcuate side wall 3c and is provided with ninety degree wall portions 3e and 3f extending tangentially to the arcuate sidewall 3c. The wall portions 3e and 3f form side walls for the housing 2 when the sled 3 is in the closed position. The sled 3 is also provided with an aperture 3g adapted to receive the post 2n whereby the sled 3 is pivotally connected to the bottom wall 2g.

A coiled torsion spring 5 is also provided for biasing the sled 3 to the open position.

The details of the assembled components of the container are illustrated in FIG. 3, wherein it will be seen that the sled 3 is pivotally connected to the pivot post 2n which extends through a coiled portion 5a of the torsion spring 5. The torsion spring 5 has a short leg portion 5b abutting a finger portion 3h integral with the sled 3, and a long leg portion 5c having an outer end portion engaging a finger portion 4a on the release button 4. The portion of the torsion spring 5 intermediate the ends supported by the stop block 2r, pin 2q and a radially outwardly extending finger portion 3i integral with the sidewall 3c of the sled 3. The bottom wall 3b of the sled is provided with a cut-out portion 3j for receiving the stop block 2r.

To complete the assemblage of the container 1, the release button 4 is pivotally connected to the pin 2a and is provided with a flange member 4b releasably engageable with the latch member 3a on the sled 3.

The operation of the compact disc container of the present invention is shown in FIGS. 4 and 5 in which the container is illustrated in the closed and open position respectively. To open the container, the release button 4 is pushed inwardly against the biasing force of the spring 5 thereby releasing the latch member 3a on the sled 3 from the flange member 4b on the release button 4, whereby the sled 3 is pivoted about post 2n to the fully open position as shown in FIG. 5. The outward pivotal movement of the carrier 3 is arrested by an edge 2s on the side wall 2h engaging a throat portion 3k on the side wall 3e of the sled 3.

From the above description it will be appreciated by those skilled in the art that the compact disc container of the present invention provides an improved compact disc container wherein only one hand is needed to open the container allowing the other hand to be used for removing the disc from the sled 3.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

I claim:

1. A compact disc container comprising a housing, said housing having a top wall, a bottom wall spaced from said top wall, side wall portions depending from said top wall, said bottom wall having integral side wall portions, a post integral with the bottom wall and positioned normal thereto, a compact disc carrier positioned in the space between the top and bottom walls of said housing, said compact disc carrier having a pair of walls extending 90 degrees relative to each other, said pair of walls forming a pair of side wall portions of said housing and a corner thereof, an arcuate side wall integral with said carrier bottom wall forming a recess adapted to receive a compact disc, said pair of walls being integral with and extending tangentially to said arcuate side wall, said compact disc carrier being pivotally mounted on said post, whereby the carrier can be pivoted from a stored position within the housing to a fully open position outside the housing from a side thereof, and spring biased latch means operatively connected between the bottom wall of said housing and the compact disc carrier, said spring biased latch means comprising a latch member integral with the compact disc carrier, a release button pivotally connected to the bottom wall of said housing, said release button including a flange member engageable with said latch member, and a spring means operatively connected to the compact disc carrier and release button, whereby when the release button is pushed, the flange member releases the latch member and the compact disc carrier is pivoted to the fully open position from the side of the housing.

2. A compact disc container, according to claim 1, wherein the spring means comprises a torsion spring having a coiled portion mounted on the post coaxially therewith, a first leg portion extending from said coiled portion engaging the compact disc carrier and a second leg portion extending from said coiled portion engaging the release button.

3. A compact disc container according to claim 1, wherein one of the pair of walls of said compact disc carrier is provided with a throat portion engageable with an edge of one of the side walls of the bottom wall to arrest the outward pivotal movement of the carrier at the fully open position.

4. A compact disc container according to claim 1, wherein the top wall of said housing is transparent, a plurality of spaced inwardly extending tabs connected to said top wall and spaced downwardly therefrom, said tabs being adapted to support a title/cover page.

5. A compact disc container according to claim 4, wherein a transparent side wall is positioned parallel to and spaced from one of the bottom wall side walls and connected to said bottom wall, whereby the space between the transparent side wall and the bottom wall side wall is adapted to receive a label.

\* \* \* \* \*